No. 875,495. PATENTED DEC. 31, 1907.
W. H. BERKHEISER.
TURNING MACHINE.
APPLICATION FILED FEB. 11, 1907. RENEWED NOV. 14, 1907.
2 SHEETS—SHEET 1.
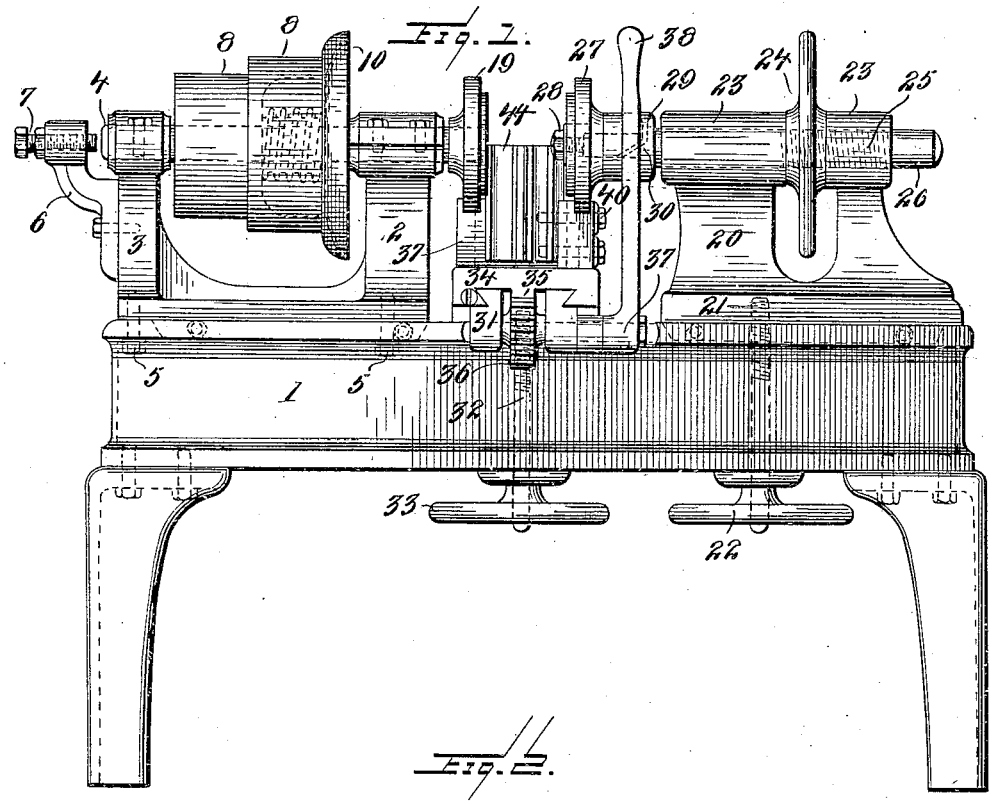
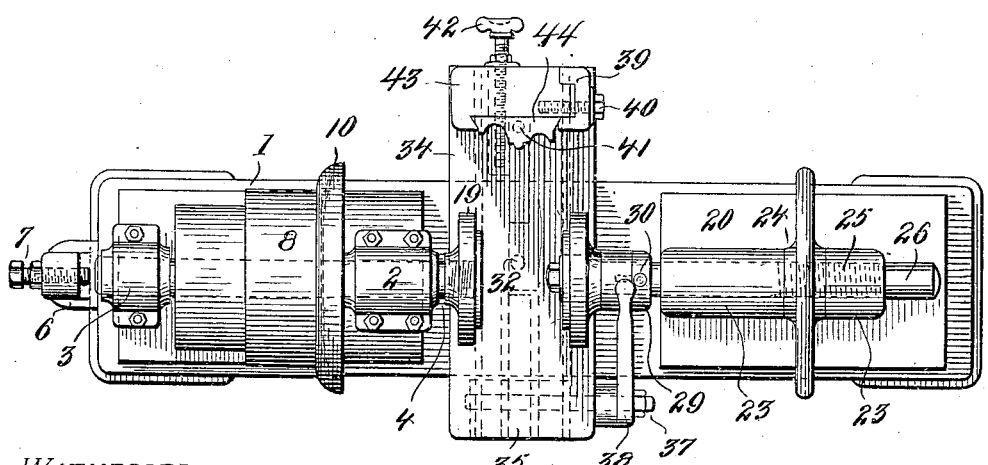
WITNESSES
INVENTOR
Wm H. Berkheiser
BY E B Stocking
Attorney No. 875,495. PATENTED DEC. 31, 1907.
W. H. BERKHEISER.
TURNING MACHINE.
APPLICATION FILED FEB. 11, 1907. RENEWED NOV. 14, 1907.
2 SHEETS—SHEET 2.
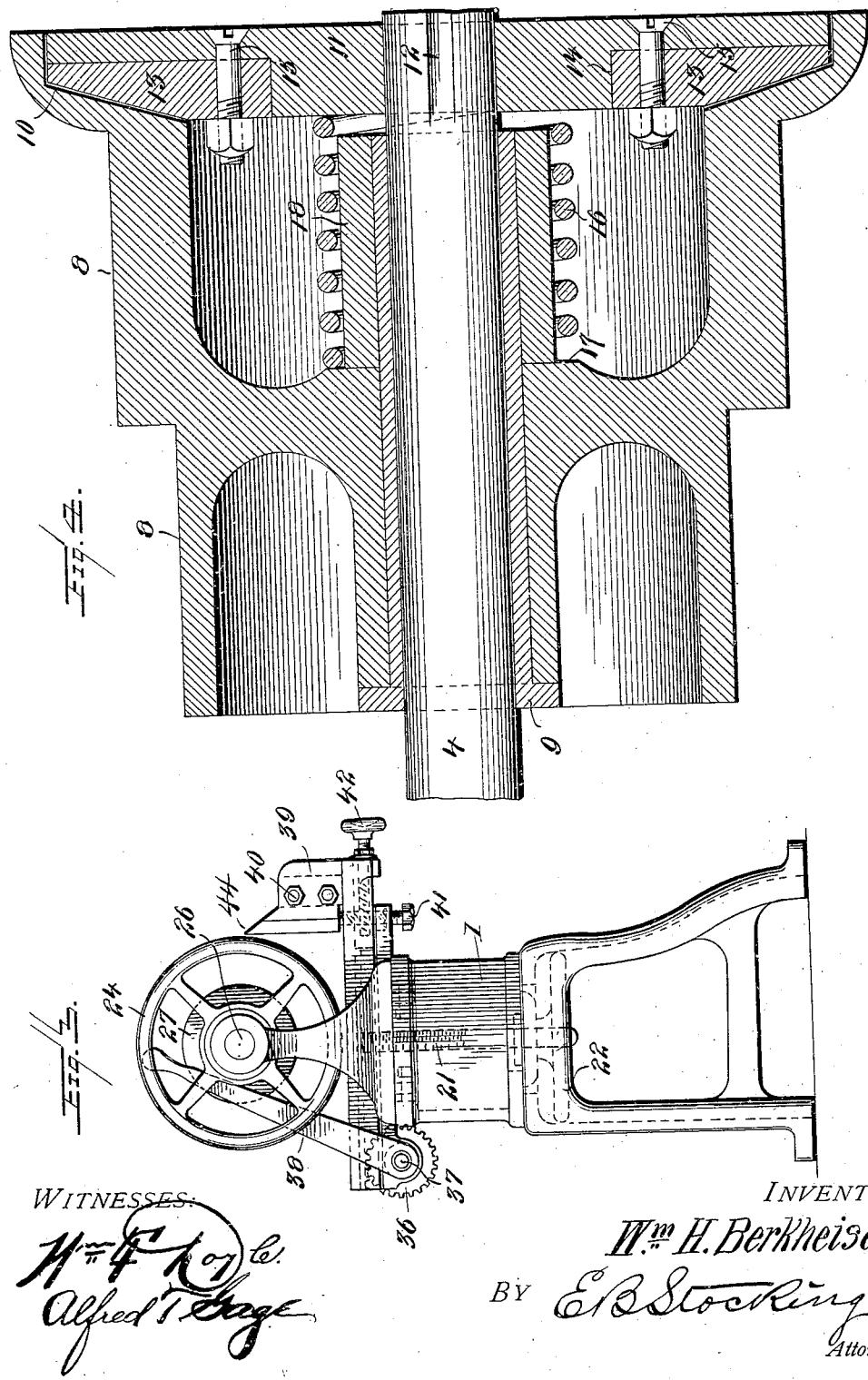
WITNESSES:
INVENTOR
W.m H. Berkheiser.
BY
Attorney

UNITED STATES PATENT OFFICE.

WILLIAM H. BERKHEISER, OF MEMPHIS, TENNESSEE, ASSIGNOR TO MEMPHIS COLUMN COMPANY, OF MEMPHIS, TENNESSEE, A CORPORATION OF MICHIGAN.

TURNING-MACHINE.

No. 875,495.  Specification of Letters Patent.  Patented Dec. 31, 1907.

Application filed February 11, 1907, Serial No. 356,810. Renewed November 14, 1907. Serial No. 402,211.

*To all whom it may concern:*

Be it known that I, WILLIAM H. BERKHEISER, citizen of the United States, residing at Memphis, in the county of Shelby, State of Tennessee, have invented certain new and useful Improvements in Turning-Machines, of which the following is a specification, reference being had therein to the accompanying drawing.

This invention relates to a turning machine, and particularly to such a machine adapted for turning cap and base pieces for use with columns or other architectural work.

The invention has for an object to provide a novel and improved construction of the machine whereby the driving pulley is automatically clutched in position as the work chucks are adjusted to the work, and the knife or cutter is mounted to travel transversely of the work.

Other and further objects and advantages will be hereinafter set forth and the novel features of the invention defined by the appended claims.

In the drawings:— Figure 1 is a side elevation of the machine; Fig. 2 is a plan; Fig. 3 is an end view thereof, and Fig. 4 is an enlarged section of the clutch connection.

Like numerals refer to like parts in the several views of the drawing.

Referring to the drawing, the numeral 1 designates the base of the machine which may be of any desired size or configuration, and is provided at one end with the bearing standards 2 and 3 in which the spindle 4 is mounted in the usual manner. These standards are fixed to the base by means of bolts 5 or other connections, and the standard 3 is provided with a bracket 6 carrying the adjustably mounted stop screw 7 which limits and determines the longitudinal movement of the spindle 4. Upon this spindle the driving pulleys 8 are mounted in any desired manner, preferably, as shown in Fig. 4, where they are loosely mounted thereon by means of the collar 9 and provided at one end with the friction face or rim 10. The spindle is also provided with the coöperating clutch member 11 comprising the disk keyed to the spindle at 12 and provided with the friction plate 13 seated in the recess 14 of the disk 11, and secured therein by any desired means, for instance the bolts 15, as shown in Fig. 4. The disk 11 is normally held away from the friction face 10 by means of the coiled spring 16 disposed within the power driving pulley 8 and bearing at one end against the wall 17 thereof, and at its opposite end against the inner face of the disk. A sleeve 18 is passed between this spring and the bearing 9 of the pulley. The inner end of the spindle 4 is provided with the chuck plate 19 secured thereto and adapted to engage the work.

At the opposite end of the frame from the driving pulley the standard 20 is mounted and adapted to be longitudinally adjusted thereon and held in position by means of the screw 21 extending upward from the base and provided with the operating handle 22 beneath said base. This standard is provided with the bearings 23 between which the hand wheel 24 is mounted and threaded upon the portion 25 of the shaft 26 carrying the adjustable chuck plate 27. This plate is mounted to freely rotate upon the end of the shaft 26 in contact with the work and rotates therewith, and may be secured in position by the clamping nut 28 extending therethrough into the end of the shaft. The shaft is also provided with the collar 29 provided with the oil passage 30 extending therethrough to properly lubricate the parts.

The knife or tool holder is mounted for adjustment transversely of the base by means of the tracks or ways 31 mounted thereon and adapted to be secured and held in position by means of the screw 32 extending upward from the base and provided with the operating wheel 33. These tracks are here shown as having dove tail connections with the carriage 34 mounted to travel thereon which is also provided with the operating rack 35 upon its under surface. This rack engages the pinion 36 mounted in lugs at the end of the track, and the shaft 37 of the pinion is provided with the operating lever 38 by which the parts may be operated to reciprocate the carriage 34. This carriage is provided with any desired form of knife or cutter holder, for instance the block 43 in which the knife 44 is seated and held in position by the clamp plate 39 through which the securing screw 40 passes. This knife is adapted to be adjusted and held in its vertical relation by means of the screw 41 passing upward between the track or ways, while the extent of travel of the carriage toward the work is determined and governed by the adjustable stop screw 42 mounted in the carriage and adapted to engage a portion of the track or base in the travel of the carriage.

In the operation of the invention, the work to be turned is disposed between the chuck plates, and the plate at the right adjusted into firm contact therewith which shifts the driving chuck and its friction clutch into contact with the continuously rotating driving pulley by which the proper power is imparted to the work. The operating lever for the carriage is then turned toward the operator and the knife brought into contact with the work to be turned, while the travel of this knife is positively determined by the adjustable stop screw. After the completion of the turning operation the adjustable chuck is withdrawn by the nut controlling the same and the spring within the driving pulley then causes the spindle and driving chuck to follow the adjustable chuck until the power is removed therefrom by separating the friction members of the clutch. It will thus be seen that the invention provides for the automatic application and withdrawal of the rotating power for the work as the same is clutched or unclutched in the machine, while the construction and arrangement of knife holder provides a positive and accurate means for adjusting the same in order to secure the most accurate work with the minimum of loss by damage or otherwise owing to the careless application of the knife to the material.

Having described my invention and set forth its merits, what I claim and desire to secure by Letters Patent is:—

1. In a turning machine, a driving chuck mounted for longitudinal movement, a clutch member adapted to move with said chuck, a driving pulley provided with a coöperating clutch member, and an adjustable chuck opposite the driving chuck.

2. In a turning machine, a driving chuck mounted for longitudinal movement, a clutch member adapted to move with said chuck, a driving pulley provided with a coöperating clutch member, an adjustable chuck opposite the driving chuck, a track or way disposed laterally between said chucks, and a knife holding carriage mounted to reciprocate upon said track.

3. In a turning machine, a driving chuck mounted for longitudinal movement, a clutch member adapted to move with said chuck, a driving pulley provided with a coöperating clutch member, an adjustable chuck opposite the driving chuck, a track or way disposed laterally between said chucks, a knife holding carriage mounted to reciprocate upon said track, a driving rack carried by said carriage, a pinion mounted in said track, and an operating lever carried by the shaft of said pinion.

4. In a turning machine, a driving chuck mounted for longitudinal movement, a clutch member adapted to move with said chuck, a driving pulley provided with a coöperating clutch member, an adjustable chuck opposite the driving chuck, a track or way disposed laterally between said chucks, a knife holding carriage mounted to reciprocate upon said track, a driving rack carried by said carriage, a pinion mounted in said track, an operating lever carried by the shaft of said pinion, and an adjustable stop screw carried by said carriage to limit the travel thereof in one direction.

5. In a turning machine, a driving chuck mounted for longitudinal movement, a clutch member carried by said chuck to move therewith, a driving pulley provided with a coöperating clutch member, a spring disposed within said pulley to normally separate said clutch members, and an adjustable chuck opposite said driving chuck.

6. In a turning machine, a driving chuck secured to a longitudinally movable shaft, a clutch disk secured to said shaft, a driving pulley having a coöperating clutch member loosely mounted upon said shaft, a spring extending between said disk and pulley to normally separate the same and an adjustable chuck opposite said driving chuck.

7. In a turning machine, a driving chuck secured to a longitudinally movable shaft, a clutch disk secured to said shaft, a driving pulley having a coöperating clutch member loosely mounted upon said shaft, a spring extending between said disk and pulley to normally separate the same, an annular friction face seated upon said disk, an adjustable screw to limit the longitudinal movement of said shaft and an adjustable chuck opposite said driving chuck.

8. In a turning machine, a longitudinally movable driving chuck, a friction clutch member carried thereby, a driving pulley having a coöperating clutch member, an adjustable chuck opposite the driving chuck and provided with a threaded shaft, separated bearings for said shaft, and a nut disposed between the bearings and threaded on said shaft.

In testimony whereof, I affix my signature in presence of two witnesses.

WILLIAM H. BERKHEISER.

Witnesses:
W. E. CONROY,
HANS JOHANNSEN.